United States Patent [19]

Nomaru et al.

[11] Patent Number: 5,155,690
[45] Date of Patent: Oct. 13, 1992

[54] METHOD AND APPARATUS FOR CAR BODY ASSEMBLING LINE CONTROL

[75] Inventors: Minoru Nomaru, Yokohama; Hiroyuki Kanno, Zama, both of Japan

[73] Assignee: Nissan Motor Co., Ltd., Yokohama, Japan

[21] Appl. No.: 513,696

[22] Filed: Apr. 25, 1990

[30] Foreign Application Priority Data

Apr. 27, 1989 [JP] Japan .................. 1-105808

[51] Int. Cl.$^5$ .................. B23P 21/00
[52] U.S. Cl. .................. 364/468; 29/407; 29/430; 29/712; 29/714; 29/720
[58] Field of Search .................. 364/468; 29/407, 430, 29/428, 429, 431, 711, 720, 712, 714; 901/7, 9

[56] References Cited

U.S. PATENT DOCUMENTS

| | | |
|---|---|---|
| 4,162,387 | 7/1979 | De Candia . |
| 4,256,947 | 3/1981 | De Candia . |
| 4,589,199 | 5/1986 | Ohtaki et al. .................. 29/430 |
| 4,736,515 | 4/1988 | Catena .................. 29/430 |
| 4,852,237 | 8/1989 | Tradt et al. .................. 29/407 |
| 4,882,836 | 11/1989 | Higuchi . |
| 4,882,837 | 11/1989 | Higuchi . |
| 4,884,329 | 12/1989 | Higuchi . |
| 4,981,252 | 1/1991 | Yazaki et al. .................. 228/102 |
| 5,005,277 | 4/1991 | Uemura et al. .................. 29/407 |
| 5,010,634 | 4/1991 | Vemura et al. .................. 29/430 |

FOREIGN PATENT DOCUMENTS

| | | |
|---|---|---|
| 0283547 | 9/1988 | European Pat. Off. . |
| 1-153387 | 6/1989 | Japan . |
| 1-311969 | 12/1989 | Japan . |
| 2211318 | 6/1989 | United Kingdom . |

Primary Examiner—Jerry Smith
Assistant Examiner—Thomas E. Brown
Attorney, Agent, or Firm—Pennie & Edmonds

[57] ABSTRACT

A method and apparatus for controlling an automotive vehicle body assembling line including a floor main assembling unit for positioning a plurality of floor main components and jointing the positioned floor main components to assemble a floor main, a body side assembling unit for positioning a plurality of body side components and jointing the positioned body side components to assemble a body side, and a vehicle body assembling unit for positioning the body side and the floor main and jointing the positioned body side and the positioned floor main to assemble a vehicle body. The pushing forces applied to respective positioning points set on the body side are measured when the vehicle body assembling unit positions the body side with respect to the floor main. A pattern of distribution of the measured pushing forces is compared with a pattern of distribution of predetermined pushing forces required to push the respective positioning points of the body side when each of the floor main components is placed at a position deviated from a predetermined position to estimate at least one floor main component which is positioned incorrectly in the floor main assembling unit. Position errors are estimated from respective standard equations based on the pushing forces measured for the estimated floor main component. Each of the standard equations defines a predetermined relationship between a pushing force and a corresponding position error. The floor main assembling unit is controlled to eliminate the estimated position errors.

22 Claims, 6 Drawing Sheets

FIG. 4

METHOD AND APPARATUS FOR CAR BODY ASSEMBLING LINE CONTROL

BACKGROUND OF THE INVENTION

This invention relates to a method and apparatus for controlling a car body assembling line.

Normal car body assembling lines include a floor main assembling station, a body side assembling station and a vehicle body assembling station. The floor main assembling station employs a floor main assembling unit to position a plurality of floor main components and join the positioned floor main components by spot welding to assemble a floor main. Similarly, the body side assembling station employs a body side assembling unit to position a plurality of body side components and join the positioned body side components by spot welding to assemble a body side. The assembled floor main and the assembled body side are transferred into the vehicle body assembling station where a vehicle body assembling unit positions the transferred parts and joins the positioned parts by spot welding to assemble a vehicle body.

It is the conventional practice to maintain the vehicle body assembling accuracy by adjusting the assembling units based on the assembling errors measured for assembled vehicle bodies sampled randomly. However, the degree of the vehicle body assembling accuracy provided by this prior art practice is limited since it is very difficult, if not impossible, to identify the one or more from among the floor main assembling unit, the body side assembling unit and the vehicle body assembling unit has positioned incorrectly based on the measured assembling errors.

SUMMARY OF THE INVENTION

It is a main object of the invention to provide a car body assembling line control method and apparatus which can provide greatly improved vehicle body assembling accuracy.

There is provided, in accordance with the invention, a method of controlling an automotive vehicle body assembling line including a floor main assembling unit for positioning a plurality of floor main components and joining the positioned floor main components to assemble a floor main, a body side assembling unit for positioning a plurality of body side components and joining the positioned body side components to assemble a body side and a vehicle body assembling unit for positioning the body side and the floor main and joining the positioned body side and the positioned floor main to assemble a vehicle body. The method comprises the steps of measuring pushing forces applied to respective positioning points set on the body side when the vehicle body assembling unit positions the body side with respect to the floor main, providing a first pattern of distribution of the measured pushing forces, providing a second pattern of distribution of predetermined pushing forces required to push the respective positioning points of the body side when each of the floor main components is placed at a position deviated from a predetermined position, comparing the first and second pushing force distribution patterns to estimate at least one floor main component which is positioned incorrectly in the floor main assembling unit, providing standard equations each defining a predetermined relationship between a pushing force and a corresponding position error, estimating position errors from the respective standard equations based on the pushing forces measured for the estimated floor main component, and controlling the floor main assembling unit to eliminate the estimated position errors.

In another aspect of the invention, there is provided an apparatus for controlling an automotive vehicle body assembling line including a floor main assembling unit for positioning a plurality of floor main components and jointing the positioned floor main components to assemble a floor main, a body side assembling unit for positioning a plurality of body side components and joining the positioned body side components to assemble a body side and a vehicle body assembling unit for positioning the body side and the floor main and joining the positioned floor main and the positioned body side to assemble a vehicle body. The apparatus comprises means for measuring pushing forces applied to respective positioning points set on the body side when the vehicle body assembling unit positions the body side with respect to the floor main, means for providing a first pattern of distribution of the measured pushing forces, means for providing a second pattern of distribution of predetermined pushing forces required to push the respective positioning points of the body side when each of the floor main components is placed at a position deviated from a predetermined position, means for comparing the first and second pushing force distribution patterns to estimate at least one floor main component which is positioned incorrectly in the floor main assembling unit, means for providing standard equations each defining a predetermined relationship between a pushing force and a corresponding position error, means for estimating position errors from the respective standard equations based on the pushing forces measured for the estimated floor main component, and means for controlling the floor main assembling unit to elimate the estimated position errors.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
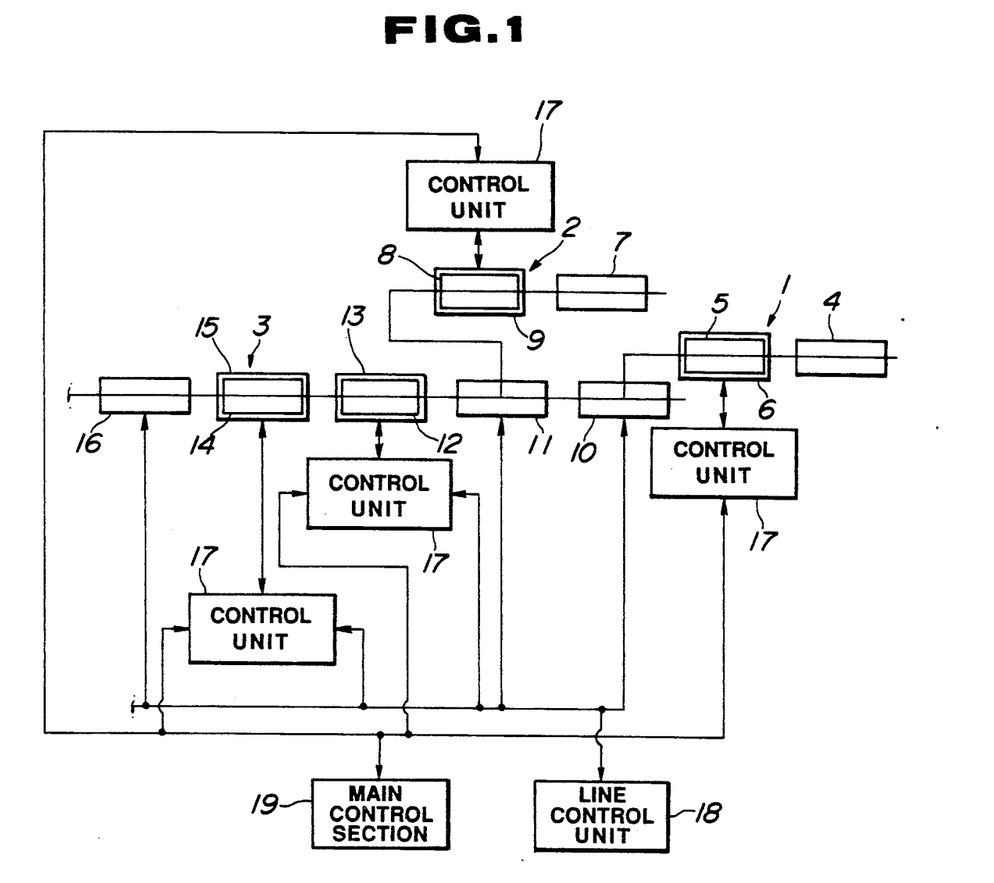
FIG. 1 is a schematic block diagram of a car body assembling line to which the invention is applied.

With reference to the drawings, where like numerals refer to like parts in the several views, and in particular to FIG. 1, there is shown a schematic block diagram of an automotive vehicle body assembling line to which the invention is applied. The assembling line is shown as including a floor main assembling sub-line 1, a body side assembling sub-line 2, and a main line 3.

The floor main assembling sub-line 1 includes a component transfer station 4 through which floor main components including a radiator core support, left- and right-side hood lids, a dash lower, a front floor, a rear floor, etc. are transferred into a floor main assembling station 5. The floor main assembling station 5 employs a floor main assembling unit 6 associated with a control unit 17 for positioning the transferred floor main components and joining the positioned floor main components by spot welding to assemble a floor main. The control unit 17 employs a digital computer for controlling the floor main assembling unit 6 based on computer aided design (CAD) data which include normal positions specified for the respective positioning points set on the floor main components. The floor main assembling unit 6 may be generally the same as disclosed in Japanese Patent Application No. 62-313023. The assembled floor main is then transferred from the floor main assembling station 5 into the main line 3.

Figure 2:
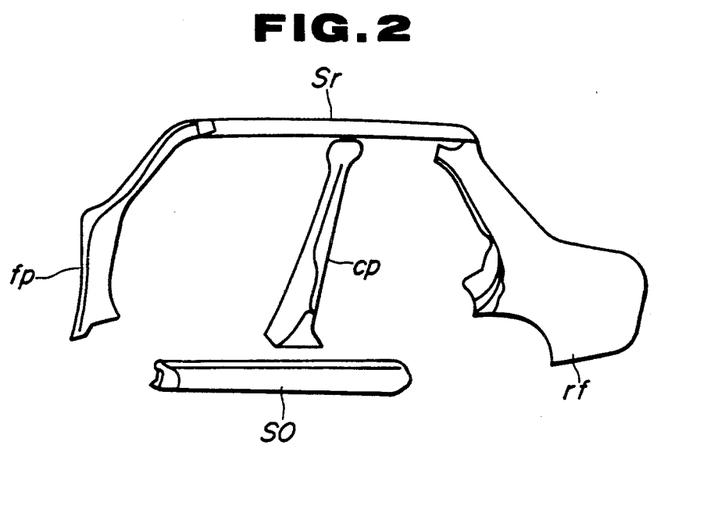
FIG. 2 is an exploded perspective view showing body side components to be joined in assembling a body side.

The body side assembling sub-line 2 includes a component transfer station 7 through which body side components including a front pillar fp, a center pillar cp, a sill outer so, a side roof rail sr, and a rear fender rf, as shown in FIG. 2, are transferred into a body side assembling station 8. The body side assembling station 8 employs a body side assembling unit 9 associated with a control unit 17 for positioning the transferred body side components and joining the positioned body side components to assemble a body side. The control unit 17 employs a digital computer for controlling the body side assembling unit based on computer aided design (CAD) data which include normal positions specified for the respective positioning points set on the body side components. The body side assembling unit 9 may be generally the same as the floor main assembling unit 6. The assembled body side is then transferred from the body side assembling station 8 into the main line 3.

The main line 3 includes a floor main transfer station 10 into which the assembled floor main is transferred from the floor main assembling station 5 and a body side transfer station 11 into which the assembled body side is transferred from the body side assembling station 8. The main line 3 also includes a tack welding station 12 into which vehicle body parts including a floor main, light- and left-body sides, a cowl top, a roof, a parcel shelf, a rear panel, etc. are transferred through the floor main transfer station 10, the body side transfer station 11, and the other transfer stations (not shown) into which vehicle body parts are transferred from unshown sub-lines. The tack welding station employs a vehicle body assembling unit 13 associated with a control unit 17 for positioning the transferred vehicle body parts and joining the positioned vehicle body parts by spot welding to assemble a vehicle body. The control unit 17 employs a digital computer for controlling the vehicle body assembling unit 13 based on computer aided design (CAD) which include normal positions specified for the respective positioning points set on the vehicle body parts. The vehicle body assembling unit 13 may be generally the same as disclosed in Japanese Patent Application No. 62-313023. The assembled vehicle body is then transferred from the tack welding station 12 into a measuring station 14. The measuring station 14 employs a position measuring unit 15 associated with a control unit 17 for measuring position errors produced at respective measuring points set on the vehicle body parts. The control unit 17 employs a digital computer for controlling the position measuring unit 15 based on computer aided design (CAD) data. The position measuring unit 15 employs a number of distance sensors, as disclosed in Japanese Patent Application No. 62-313023, for measuring the positions of the respective measuring points and compares the measured positions with normal positions specified in the CAD data for the respective measuring points. The assembled vehicle body is then transferred from the measuring station 14 into a following station where the integirity of the vehicle body is increased to a sufficient extent by spot welding.

The numeral 18 designates a line control unit for controlling the operation timing of the stations provided on the main line 3, and the numeral 19 designates a main control unit connected to provide correction command to the control units 17.

Figure 3:
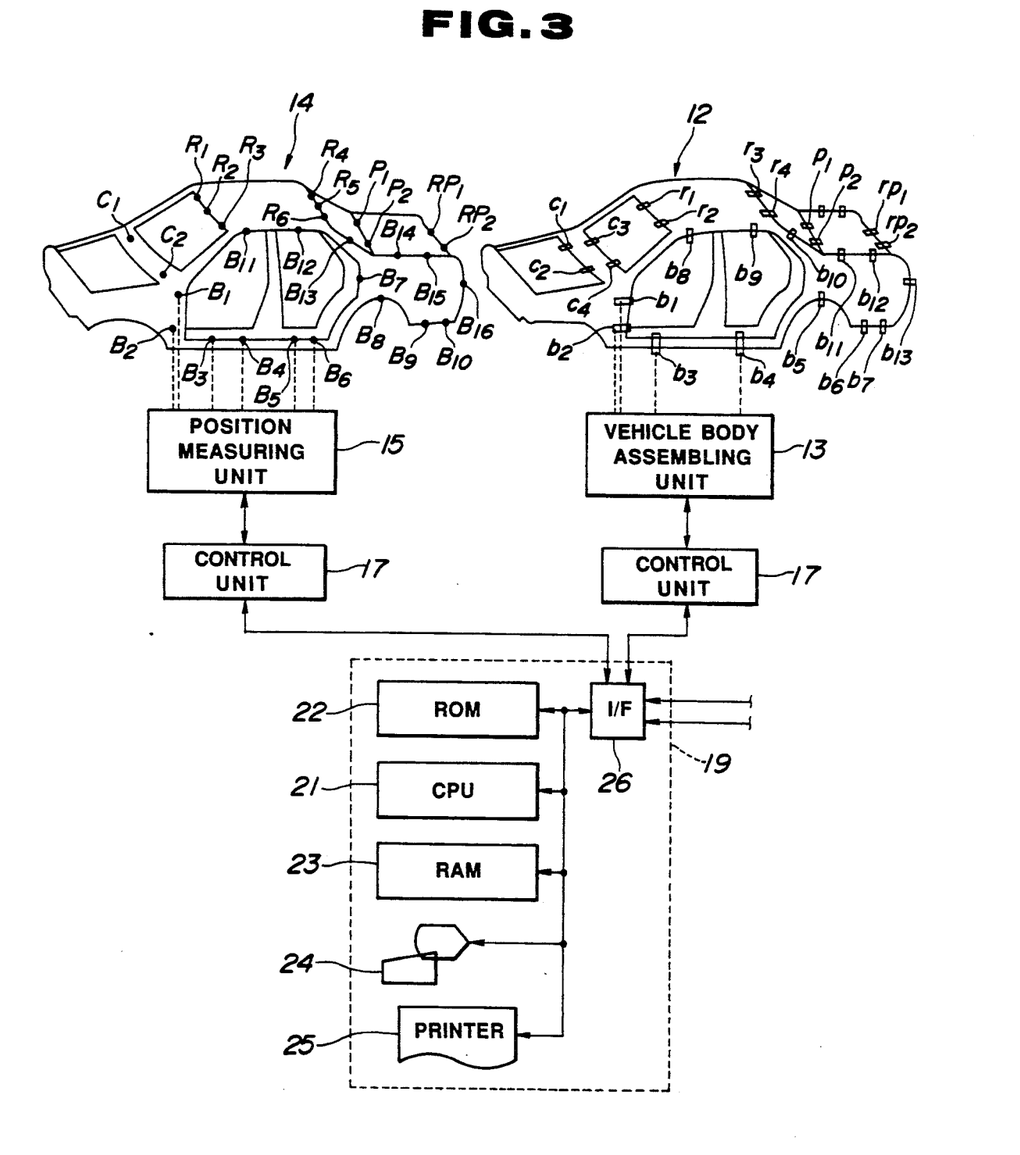
FIG. 3 is a schematic block diagram showing a main control section used for car body assembling line control made in accordance with the invention.

Referring to FIG. 3, the vehicle body assembling unit 13 operates on command from the associated control unit 17 in the vehicle body assembling station 12. The vehicle body assembling unit 13 positions the body side with respect to the floor main based on the CAD data by activating manipulator arms to carry their positioning tools so as to push respective positioning points b1 to b13 set on the body side. Then, the vehicle body assembling unit 13 positions the cowl top based on the CAD data by activating manipulator arms to carry their positioning tools so as to push respective positioning points c1 to c4 set on the cowl top. Subsequently, the vehicle body assembling unit 13 positions the roof based on the CAD data by activating manipulator arms to carry their positioning tools so as to push respective positioning points r1 to r4 set on the roof. Similarly, the vehicle body assembling unit 13 positions the percel shelf by activating manipulator arms to carry their positioning tools so as to push respective positioning points p1 and p2 set on the percel shelf. The vehicle body assembling unit 13 positions the rear panel by activating manipulator arms to carry their positioning tools so as to push respective positioning points rp1 and rp2 set on the rear panel. The vehicle body assembling unit 13 also includes pushing force sensors for measuring the pushing force values applied to the respective positioning points in positioning the vehicle body parts. The measured pushing force values are accumulated in the computer memory of the control unit 17 associated with the vehicle body assembling unit 13. The accumulated pushing force values forms measured pushing force data. The measured pushing force data are transferred to the main control unit 19. It is to be noted that the pushing force values may be obtained by the measurement of currents applied to drive the servo motors provided in the manipulator arms to operate the respective positioning tools. The control unit uses the accumulated pushing force data to provide a pattern of distribution of the measured pushing forces. The measured pushing force distribution pattern is transferred to the main control unit 19.

The position measuring unit 15 operates on command from the associated control unit 17 to activate servo motors to carry the corresponding distance sensors to measure the positions of respective measuring points B1 to B16 set on the body side, servo motors to carry the corresponding distance sensors to measure the positions of respective measuring points C1 and C2 set on the cowl top, servo motors to carry the corresponding distance sensors to measure the positions of respective measuring points R1 to R4 set on the roof, servo motors to carry the corresponding distance sensors to measure the positions of respective measuring points P1 and P2 set on the percel shelf, and servo motors to carry the corresponding distance sensors to measure the positions of respective measuring points RP1 and RP2 set on the rear panel. The measuring points may correspond to the respective positioning points. The measured position values are accumulated in the computer memory of the control unit 17 associated with the position measuring unit 15. The accumulated position values form measured position data. The control unit 17 compares the measured position data with the CAD data to calculate position errors for the respective measuring points. The calculated position errors forms position error data. The position error data are transferred to the main control unit 19.

The main control unit 19 employs a digital computer which includes a central processing unit (CPU) 21, a read only memory (ROM) 22, a random access memory (RAM) 23, a terminal unit 24, a printer 25, and an interface (I/F) 26. The central processing unit 21 communicates with the rest of the computer through a data bus and also with the control units 17 through the interface 25. The read only memory 22 contains the program for operating the central processing unit 21. The random access memory 23 temporarily stores various data. The terminal unit 24 includes a key board used for data or program inputting and data modification, and a display used for data or program displaying. The printer 25 is used for data or program printing.

Figure 4:
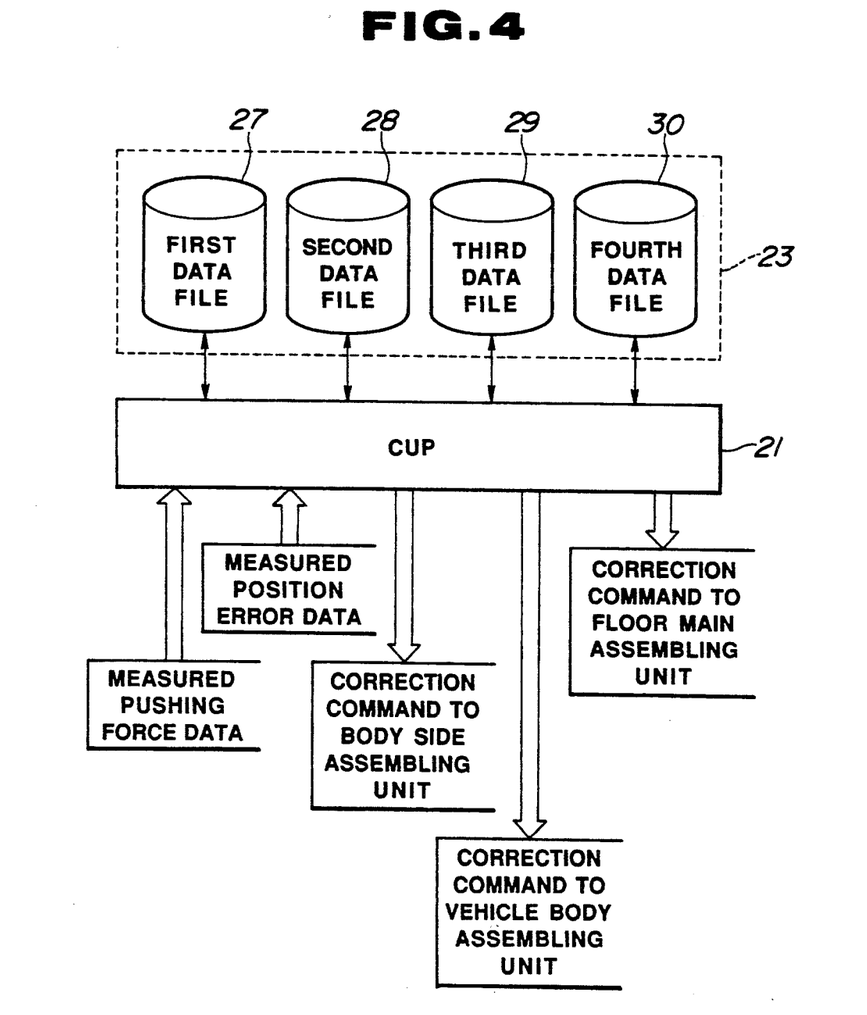
FIG. 4 is a schematic block diagram showing data files used in the main control section.

Referring to FIG. 4, the random access memory 23 is shown as having first, second, third and fourth data files 27, 28, 29 and 30 stored therein. The first data file 27 includes computer aided design (CAD) data, as shown in table 1. The CAD data include normal position data defining normal positions specified for the respective positioning points and acceptable position error range data defining acceptable ranges of the position errors produced at the respective positioning points. Each of the normal positions is expressed as a three-dimensional standard coordinate (X, Y, Z). Each of the position errors is also expressed in the three-dimensional standard coordinates (X, Y, Z). The X-axis extends in the direction of the width of the vehicle body, The Y-axis extends in the direction of the length of the vehicle body, and the Z-axis extends in the direction of the height of the vehicle body.

TABLE 1

| measuring point | X | Y | Z | acceptable range | | |
|---|---|---|---|---|---|---|
| | | | | X | Y | Z |
| B1 | 5622 | 5000 | 4301 | ±0.25 | ±0.25 | ±0.25 |
| B2 | 5620 | 5000 | 2302 | ... | ... | ... |
| ... | ... | ... | ... | ... | ... | ... |

The second data file 28 includes pushing force distribution pattern defining a predetermined pattern of distribution of the pushing forces required for the positioning tools to push the respective positioning points when each of the floor main components, such as a dash lower, a front floor, a rear floor, etc., is placed at a position deviated a predetermined amount (for example, 1 mm) toward the body side, as shown in table 2.

TABLE 2

| component | b1 | b2 | b3 | b4 | b5 | ... | b13 |
|---|---|---|---|---|---|---|---|
| dash lower | 0.8 | 0.8 | 0.5 | — | — | — | — |
| front floor | 0.2 | 0.3 | 0.8 | 0.8 | 0.1 | 0.1 | — |

TABLE 2-continued

| component | b1 | b2 | b3 | b4 | b5 | ... | b13 |
|---|---|---|---|---|---|---|---|
| rear floor | 0.0 | 0.0 | 0.2 | 0.8 | 0.2 | — | — |
| ... | ... | ... | ... | ... | ... | ... | ... |

The third file 29 includes standard equations each defining a predetermined relationship between a pushing force F applied to the corresponding positioning point and a position error $\Delta X$ produced at the corresponding positioning point, and acceptable pushing force ranges specified for the respective positioning points, as shown in Table 3.

TABLE 3

| positioning point | standard equation | acceptable range (kgf) |
|---|---|---|
| b1 | $F = \Delta X_{B1} + C_{b1}$ | 100–200 |
| b2 | $F = \Delta X_{B2} + C_{b2}$ | 150–250 |
| ... | ... | ... |

The fourth data file 30 include tool rule data defining amounts in which the positions of the respective positioning points (for example, fp2 and fp3) set on a component (for example, the front pillar fp) having a positioning point (for example, fp1) set thereon should be changed when the position of the positioning point (fp1) should be changed a predetermined amount (for example, 1 mm), as shown in table 4. This is effective to avoid rotation of the component which may occur when a position change is made for only one of the positioning points set on the component.

TABLE 4

| positioning point | correction amount | fp1 | fp2 | fp3 | so1 | so2 | ... | rf7 |
|---|---|---|---|---|---|---|---|---|
| fp1 | 1 (mm) | — | 1 | 0.5 | 0.0 | 0.0 | ... | 0.0 |
| fp2 | 1 (mm) | ... | — | ... | ... | ... | ... | ... |
| ... | 1 (mm) | ... | ... | ... | ... | ... | ... | ... |

Figure 5:
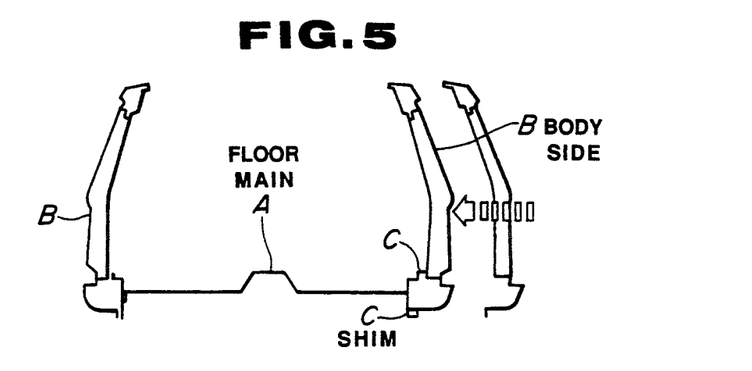
FIG. 5 is a view used in explaining the manner in which the data files are obtained.
Figure 6:
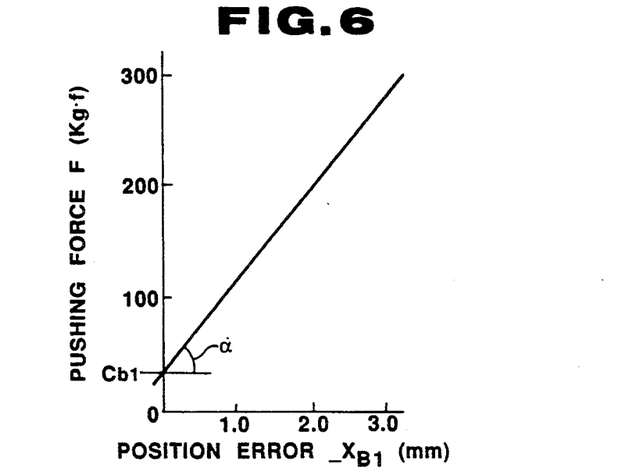
FIG. 6 is a graph of position error versus pushing force.

For example, the pushing force distribution pattern, the standard equations, and the acceptable pushing force ranges may be obtained from relationships between the pushing forces applied to push the respective positioning points of the body side B having normal dimensions toward the floor main A having normal dimensions and the position errors measured at the respective positioning points while changing the thickness and position of a shim C provided between the floor main A and the body side B to simulate a deviation of the floor main A from a correct position, as shown in FIG. 5. Alternatively, the relationships may be derived from relationships between external forces applied to respective points set on an object and the respective deformations at the respective points. FIG. 6 shows a relationship between a pushing force and a position error obtained for the front pillar of a body side.

The main control unit 19 receives the measured pushing force data from the control unit 17 associated with the vehicle body assembling unit 13 and the measured position error data from the control unit 17 associated with the position measuring unit 15. The main control unit 19 produces correction commands to the control units 17 associated with the floor main assembling unit 6, the body side assembling unit 9 and the vehicle body assembling unit 13 if required.

Figure 7A:
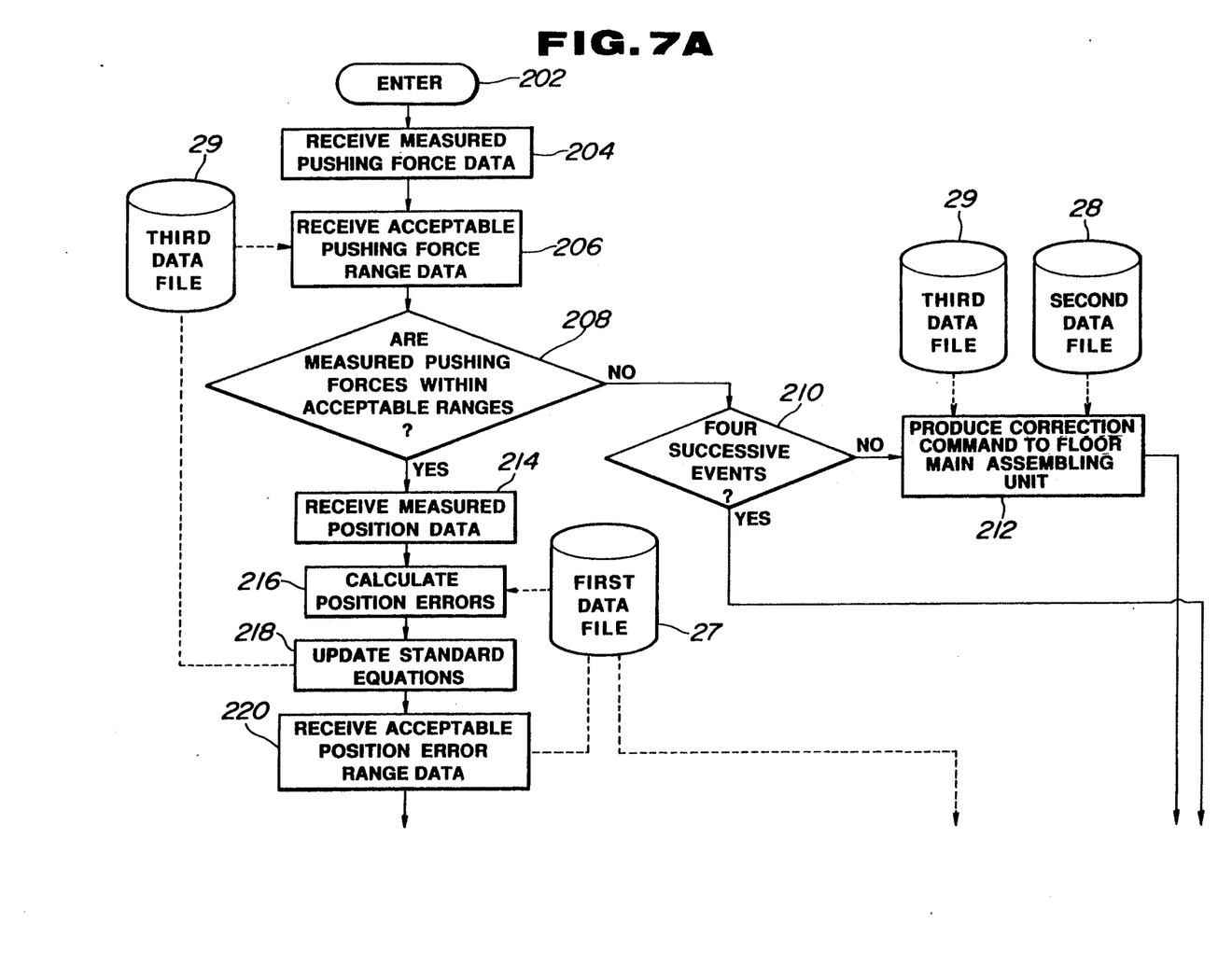
FIGS. 7A and 7B are flow diagrams illustrating the programming of the digital computer used in the main control section.
Figure 7B:
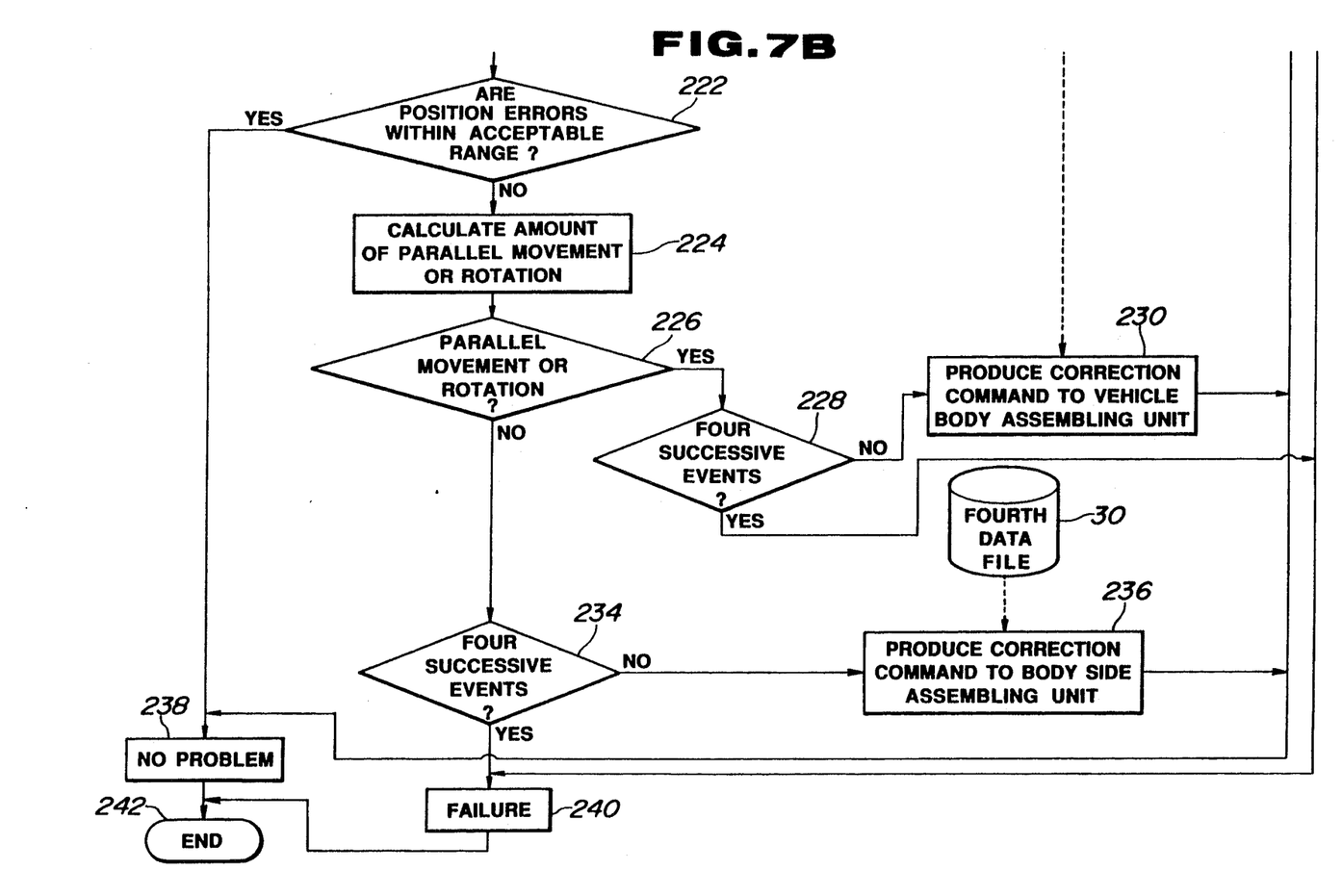

FIG. 7 is a flow diagram illustrating the programming of the digital computer used in the main control section 19. The computer program is entered at the point 202. At the point 204 in the program, the measured pushing force data are transferred into the computer memory 23 from the control unit 17 associated with the vehicle body assembling unit 13. The measured pushing force data include the measured values of the pushing forces actually applied to the positioning points b1 to b13 set on the body side by the respective positioning tools. The pushing force values may be obtained by the measurement of current applied to drive the servo motors provided in the manipulator arms to operate the respective positioning tools.

At the point 206 in the program, the acceptable pushing force range data are transferred into the computer memory 23 from the third data file 29. The acceptable pushing force range data include acceptable ranges specified for the pushing forces applied to the respective positioning points. At the point 208 in the program, a determination is made as to whether or not each of the measured pushing force values is within the corresponding one of the acceptable ranges. If the answer to this question is "yes" for all of the measured pushing force values, then it means that the floor main assembling unit 6 has positioned all of the floor main components correctly and the program proceeds to the point 214. Otherwise, the program proceeds to another determination step at the point 210. This determination is as to whether or not there have been a predetermined number of (in this case four) successive events where at least one of the pushing force values measured for one floor main component is out of the corresponding acceptable range. If the answer to this question is "yes", then it means that the floor main assembling unit 6 and/or the vehicle body assembling unit 13 have failed to make any appropriate position correction and the program proceeds to the point 240 where the central processing unit 21 provides a production stop command and a reminder to the operator that a failure occurs body assembling unit 13 through the terminal unit 24 and/or the printer 25. Following this, the program proceeds to the end point 242.

If the answer to the question inputted at the point 210 is "no", then the program proceeds to the point 212 where the central processing unit 21 produces a correction command to the control unit 17 associated with the floor main assembling unit 6. For this purpose, the central processing unit 21 compares the measured pushing force distribution pattern with the pushing force distribution pattern transferred into the computer memory 23 from the second data file 28 to estimate one or more floor main components which have been positioned incorrectly. The pushing force distribution pattern defines a predetermined pattern of distribution of the pushing forces required for the positioning tools to push the respective positioning points when each of the floor main components is placed at a position deviated a predetermined amount toward the body side. The central processing unit 21 uses the standard equations transferred into the computer memory 23 from the third data file 29 to calculate position errors ($\Delta X$) at the respective positioning points related to each of the estimated floor main components. Each of the position errors ($\Delta X$) is calculated by substituting the measured pushing force applied to the corresponding positioning point for F in the standard equation related to the corresponding positioning point. It is to be noted that the calculated position error ($\Delta X$) corresponds to the position error introduced when the floor main assembling unit 6 positioned the estimated floor main component since a position error introduced when the body side is assembled normally occurs in the Y- and/or Z-directions. The correction command, which defines the calculated position errors related to the estimated floor main component, is fed to the control unit 17 causing the floor main assembling unit 6 to eliminate the calculated position errors ($\Delta X$). The program proceeds from the point 212 to the point 238 where the central processing unit 21 provides a remainder to the operator that no trouble occurs in the assembling line through the terminal unit 24. Following this, the program proceeds to the end point 242.

At the point 214 in the program, the measured position data are transferred into the computer memory 23 from the control unit 17 associated with the position measuring unit 15. The measured position data include positions measured for the respective measuring points B1, B2, ..., each of the measured positions being expressed as a three-dimensional standard coordinate (X, Y, Z). At the step 216 in the program, the central processing unit 21 compares the measured position data with the CAD data transferred into the computer memory 23 from the first data file 27 to calculate position errors at the respective measuring points B1, B2, .... The CAD data include normal positions specified for the respective measuring points B1, B2, ..., each of the normal positions being expressed as a three-dimensional standard coordinates (X, Y, Z). Each of the position errors is calculated by subtracting the normal position specified for the corresponding measuring point from the position measured therefor. The calculated position error is also expressed in the three-dimensional standard coordinates (X, Y, Z). At the point 218 in the program, the central processing unit 21 corrects each of the standard equations based on a relationship between the pushing force measured for the corresponding positioning point and the position error ($\Delta X$) calculated for the corresponding measuring point. The corrected standard equations are used to update the respective standard equations stored in the third data file 29.

At the point 220 in the program, the acceptable position error range data are transferred into the computer memory 23 from the first data file 27. The acceptable position error range data include acceptable ranges specified for the position errors produced at the respective measuring points B1, B2, ... At the point 222 in the program, a determination is made as to whether or not each of the position errors calculated at the point 216 is within the corresponding one of the acceptable ranges. If the answer to this question is "yes" for all of the measured points B1, B2, ..., then the program proceeds to the point 238. Otherwise, the program proceeds to the point 224 where the central processing unit 21 calculates the amount of parallel movement or rotation of the body side from the existing position to place all of the calculated position errors within the corresponding acceptable ranges. The body side is considered to be shifted to a position parallel with the correct position when all of the calculated position errors are placed within the corresponding acceptable ranges by the parallel movement of the body side from the existing position. Alternatively, the body side is considered to be rotated from the correct position when all of the calculated position errors are placed within the corresponding acceptable ranges by the rotation of the side body from the existing position. A conventional three-dimensional coordinate transformation technique may be used to perform this calculation.

At the point 226 in the program, a determination is made as to whether or not the body side position error is caused by parallel movement or rotation of the body side from the correct position. This determination is made based on the result of the calculation made at the point 224. If the answer to this question is "yes", then it means that the vehicle body assembling unit 13 has positioned the body side incorrectly and the program proceeds to another determination point 228. This determination is as to whether or not there have been a predetermined number of (in this case four) successive events where the body side position error is caused by parallel movement or rotation of the body side from the correct position. If the answer to this question is "yes", then it means that the vehicle body assembling unit 13 has failed to make any appropriate body side position correction and the program proceeds to the point 240 where the central processing unit 21 provide a production stop command and a reminder to the operator that a failure occurs in the vehicle body assembling unit 13.

If the answer to the question inputted at the point 228 is "no", then the program proceeds to the point 230 where the central processing unit 21 produces a correction command to the control unit 17 associated with the vehicle body assembling unit 13. The correction command, which defines the amount calculated at the point 224, is fed to the control unit 17 causing the vehicle body assembling unit 13 to eliminate the calculated position errors. Following this, the program proceeds to the point 238.

If the answer to the question inputted at the point 226 is "no", then it means that the body side assembling unit 9 has incorrectly positioned one or more body side components and the prgram proceeds to another determination step at the point 234. This determination is as to whether or not there have been a predetermined number of (in this case four) successive events where the body side assembling unit 9 has positioned one body side component incorrectly. If the answer to this question is "yes", then it means that the body side assembling unit 9 has failed to make any appropriate position correction and the program proceeds to the point 240 where the central processing unit 21 provides a production stop command and a reminder to the operator that a failure occurs in the body side assembling unit 9 and/or the vehicle body assembling unit 13 through the terminal unit 24 and/or the printer 25. Otherwise, the program proceeds to the point 236 where the central processing unit 21 produces a correction command to the control unit 17 associated with the body side assembling unit 9. For this purpose, the central processing unit 21 estimates the body side component which has been positioned incorrectly based on the measuring point for which the position error is out of the corresponding acceptable range and calculates the amounts in which the positioning tools should change the positions of the respective positioning points set on the estimated body side component. This calculation is made based on the tool rule data transferred into the computer memory 23 from the fourth data file 30. The tool rule data include the amounts by which the positioning tools should change the positions of the respective positioning points set on the estimated body side component when the position of the positioning point for which the position error is out of the acceptable range is changed a predetermined amount. The correction command, which defines the calculated positioning tool position change, is fed to the control unit 17 causing the body side assembling unit 9 to eliminate the calculated position errors. This is effective to avoid rotation of the side body component which may occur when a position correction is made only for the positioning point for which the position error is out of the acceptable range.

Following this, the program proceeds to the end point 242. These operations are repeated each time a vehicle body is assembled.

According to the invention, which one of the floor main assembling unit 6, the body side assembling unit 9 and the vehicle body assembling unit 13 has positioned one or more components incorrectly can be detected based on one or more position errors measured for the assembled vehicle body. The main control unit 19 produces a correction command causing the detected assembling unit to correct the position errors. It is, therefore, possible to increase the vehicle body assembling accuracy to a great extent.

What is claimed is:

1. A method of controlling an automotive vehicle body assembling line including a floor main assembling unit for positioning a plurality of floor main components and joining the positioned floor main components to assemble a floor main, a body side assembling unit for positioning a plurality of body side components and joining the positioned body side components to assemble a body side, and a vehicle body assembling unit for positioning the body side and the floor main and joining the positioned body side and the positioned floor main to assemble a vehicle body, the method comprising the steps of:

measuring pushing forces applied to respective positioning points set on the body side when the vehicle body assembling unit positions the body side with respect to the floor main;

accumulating the measured pushing forces to provide a first pattern of distribution of the measured pushing forces;

inputting a second pattern of distributing of predetermined pushing forces required to push the respective positioning points of the body side when each of the floor main components is placed at a position deviated from a predetermined position;

comparing the first and second pushing force distribution patterns to estimate at least one floor main component which is positioned incorrectly in the floor main assembling unit;

providing standard equations each defining a predetermined relationship between a pushing force and a corresponding position error;

estimating position errors from the respective standard equations based on the pushing forces measured for the estimated floor main component; and controlling the floor main assembling unit to eliminate the estimated position errors.

2. The method as claimed in claim 1, further comprising the steps of providing predetermined acceptable pushing force ranges specified for the pushing forces applied to the respective positioning points of the body side, and detecting a failure in the floor main assembling unit when there are a predetermined number of successive events where at least one of the pushing forces measured for one floor main component is out of the corresponding one of the acceptable pushing force ranges.

3. The method as claimed in claim 1, further comprising the steps of measuring positions of a plurality of measuring points set on the body side, means for providing first position data defining positions measured for the respective measuring points of the body side, providing second position data defining normal positions specified for the respective measuring points of the body side, and comparing the first and second position data to calculate position errors produced at the respective measuring points of the body side.

4. The method as claimed in claim 3, further comprising the steps of providing predetermined acceptable pushing force ranges specified for the pushing forces applied to the respective positioning points of the body side, and correcting each of the standard equations based on a relationship between the pushing force measured for the corresponding positioning point and the position error calculated for the corresponding measuring point when all of the the measured pushing forces are within the respective acceptable pushing force ranges.

5. The method as claimed in claim 3, further comprising the steps of providing predetermined acceptable pushing force ranges specified for the pushing forces applied to the respective positioning points of the body side, providing predetermined acceptable position error ranges specified for the position errors produced at the respective measuring points of the side body, and detecting parallel movement or rotation of the side body based on the position errors being out of the corresponding acceptable position error ranges, the detection being made when all of the measured pushing forces are within the respective acceptable pushing force ranges.

6. The method as claimed in claim 5, wherein the step of detecting parallel movement or rotation of the side body includes the steps of detecting parallel movement of the side body when all of the calculated position errors are placed within the corresponding acceptable position error ranges by parallel movement of the body side, and detecting rotation of the side body when all of the calculated position errors are placed within the corresponding acceptable position error ranges by rotation of the body side.

7. The method as claimed in claim 6, further comprising the steps of calculating an amount of parallel movement or rotation of the body side from a correct position, and controlling the vehicle body assembling unit to rotate or move body side in the calculated amount so as to eliminate the calculated position errors.

8. The method as claimed in claim 6, further comprising the step of detecting a failure in the vehicle body assembling unit when there are a predetermined number of successive events where the calculated position errors are caused by rotation or parallel movement of the body side from a correct position.

9. The method as claimed in claim 5, further comprising the step of controlling the body side assembling unit to eliminate the calculated position errors when neither parallel movement nor rotation of the side body occurs.

10. The method as claimed in claim 9, further comprising the steps of detecting a body side component having at least one defective measuring point at which the calculated position error is out of the corresponding acceptable position error range, providing rule data defining amounts in which the positions of the respective positioning points set on the detected body side component should be changed when the position of the positioning point corresponding to the defective measuring point is changed a predetermined amount, calculating amounts in which the positions of the respective positioning points of the detected body side component should be changed from the rule data based on the calculated position error, and controlling the body side assembling unit to change the positions of the positioning points of the detected base body component in the respective calculated amounts.

11. The method as claimed in claim 5, further comprising the step of detecting a failure in the body side assembling unit when there are a predetermined number of successive events where one body side component has at least one defective measure point at which the calculated position error is out of the corresponding acceptable position error range.

12. An apparatus for controlling an automotive vehicle body assembling line including a floor main assembling unit for positioning a plurality of floor main components and joining the positioned floor main components to assemble a floor main, a body side assembling unit for positioning a plurality of body side components and joining the positioned body side components to assemble a body side, and a vehicle body assembling unit for positioning the body side and the floor main and joining the positioned body side and the positioned floor main to assemble a vehicle body, the apparatus comprising:

means for measuring pushing forces applied to respective positioning points set on the body side when the vehicle body assembling unit positions the body side with respect to the floor main;

means for accumulating the measured pushing forces to provide a first pattern of distribution of the measured pushing forces;

means for inputting a second pattern of distributing of predetermined pushing forces required to push the respective positioning points of the body side when each of the floor main components is placed at a position deviated from a predetermined position;

means for comparing the first and second pushing force distribution patterns to estimate at least one floor main component which is positioned incorrectly in the floor main assembling unit;

means for providing standard equations each defining a predetermined relationship between a pushing force and a corresponding position error;

means for estimating position errors from the respective standard equations based on the pushing forces measured for the estimated floor main component; and means for controlling the floor main assembling unit to eliminate the estimated position errors.

13. The apparatus as claimed in claim 12, further comprising means for providing predetermined acceptable pushing force ranges specified for the pushing forces applied to the respective positioning points of the body side, and means for detecting a failure in the floor main assembling unit in response to a predetermined number of successive events where at least one of the pushing forces measured for one floor main component is out of the corresponding one of the acceptable pushing force ranges.

14. The apparatus as claimed in claim 12, further comprising means for measuring positions of a plurality of measuring points set on the body side, means for providing first position data defining positions measured for the respective measuring points of the body side, means for providing second position data defining normal positions specified for the respective measuring points of the body side, and means for comparing the first and second position data to calculate position errors produced at the respective measuring points of the body side.

15. The apparatus as claimed in claim 14, further comprising means for providing predetermined acceptable pushing force ranges specified for the pushing forces applied to the respective positioning points of the body side, and means for correcting each of the standard equations based on a relationship between the pushing force measured for the corresponding positioning point and the position error calculated for the corresponding measuring point when all of the the measured pushing forces are within the respective acceptable pushing force ranges.

16. The apparatus as claimed in claim 14, further comprising means for providing predetermined acceptable pushing force ranges specified for the pushing forces applied to the respective positioning points of the body side, means for providing predetermined acceptable position error ranges specified for the position errors produced at the respective measuring points of the side body, and means operable when all of the measured pushing forces are within the respective acceptable pushing force ranges for detecting parallel movement or rotation of the side body based on the position errors being out of the corresponding acceptable position error ranges.

17. The apparatus as claimed in claim 16, wherein the means for detecting parallel movement or rotation of the side body includes means for detecting parallel movement of the side body when all of the calculated position errors are placed within the corresponding acceptable position error ranges by parallel movement of the body side, and means for detecting rotation of the side body when all of the calculated position errors are placed within the corresponding acceptable position error ranges by rotation of the body side.

18. The apparatus as claimed in claim 17, further comprising means for calculating an amount of parallel movement or rotation of the body side from a correct position, and means for controlling the vehicle body assembling unit to rotate or move body side in the calculated amount so as to eliminate the calculated position errors.

19. The apparatus as claimed in claim 17, further comprising means for detecting a failure in the vehicle body assembling unit when there are a predetermined number of successive events where the calculated position errors are caused by rotation or parallel movement of the body side from a correct position.

20. The apparatus as claimed in claim 16, further comprising means operable when neither parallel movement nor rotation of the side body occurs for controlling the body side assembling unit to eliminate the calculated position errors.

21. The apparatus as claimed in claim 20, further comprising means for detecting a body side component having at least one defective measuring point at which the calculated position error is out of the corresponding acceptable position error range, means for providing rule data defining amounts in which the positions of the respective positioning points set on the detected body side component should be changed when the position of the positioning point corresponding to the defective measuring point is changed a predetermined amount, means for calculating amounts in which the positions of the respective positioning points of the detected base body component should be changed from the rule data based on the calculated position error, and means for controlling the body side assembling unit to change the positions of the positioning points of the detected body side component in the respective calculated amounts.

22. The apparatus as claimed in claim 16, further comprising means for detecting a failure in the body side assembling unit in response to a predetermined number of successive events where one body side component has at least one defective measure point at which the calculated position error is out of the corresponding acceptable position error range.

* * * * *